United States Patent [19]
Preukschat

[11] Patent Number: 5,833,037
[45] Date of Patent: Nov. 10, 1998

[54] VIBRATION DAMPER OR SHOCK ABSORBER HAVING APPARATUS FOR DAMPING SPRING-MOUNTED WHEEL SUSPENSION SYSTEMS

[75] Inventor: Alfred Preukschat, Königswinter, Germany

[73] Assignee: Fichtel & Sachs AG, Schweinfurt, Germany

[21] Appl. No.: 493,839

[22] Filed: Jun. 22, 1995

[30] Foreign Application Priority Data

Jun. 24, 1994 [DE] Germany ............... 44 21 908.3
Apr. 8, 1995 [DE] Germany ............... 195 13 470.2

[51] Int. Cl.$^6$ ............... F16F 9/46; B60G 17/015
[52] U.S. Cl. ............... 188/299.1
[58] Field of Search ............... 188/299, 322.13, 188/322.19, 319, 318, 282, 285; 280/707

[56] References Cited

U.S. PATENT DOCUMENTS

| | | | |
|---|---|---|---|
| 4,877,225 | 10/1989 | Noguchi . | |
| 4,921,272 | 5/1990 | Ivers . | |
| 4,993,523 | 2/1991 | Schwemmer et al. . | |
| 5,139,119 | 8/1992 | Karnopp . | |
| 5,335,757 | 8/1994 | Knecht et al. ............ | 188/299 |
| 5,386,893 | 2/1995 | Feigel ............ | 188/299 |
| 5,400,877 | 3/1995 | Kircher et al. ............ | 188/299 |
| 5,611,413 | 3/1997 | Feigel ............ | 188/299 |

FOREIGN PATENT DOCUMENTS

| | | |
|---|---|---|
| 0335016 | 10/1989 | European Pat. Off. . |
| 0346040 | 12/1989 | European Pat. Off. . |
| 0405123 | 1/1991 | European Pat. Off. . |
| 0411337 | 2/1991 | European Pat. Off. . |
| 3522105 | 1/1986 | Germany . |
| 3711002 | 10/1988 | Germany . |
| 3827538 | 2/1990 | Germany . |
| 4022098 | 7/1991 | Germany . |
| 4025880 | 2/1992 | Germany . |
| 2168455 | 6/1986 | United Kingdom . |

Primary Examiner—Robert J. Oberleitner
Assistant Examiner—Chris Schwartz
Attorney, Agent, or Firm—Nils H. Ljungman and Associates

[57] ABSTRACT

An apparatus for damping spring-mounted wheel suspension systems is disclosed as having a cylinder filled with damping medium. The cylinder is divided by a piston on a piston rod into two work chambers. The two work chambers are connected to one another by damping valves and an additional fluid connection. The additional fluid connection is provided with a non-return valve between the two work chambers. The non-return valve has an actuator which can be switched as desired inside a valve device. The valve device has a damping force adjustment which acts in opposite directions for the two directions of flow. At least one non-return valve is dependent on the direction of flow and is provided with resistance. The non-return valve is moved into its operating position by the actuator.

18 Claims, 7 Drawing Sheets

FIG. 5
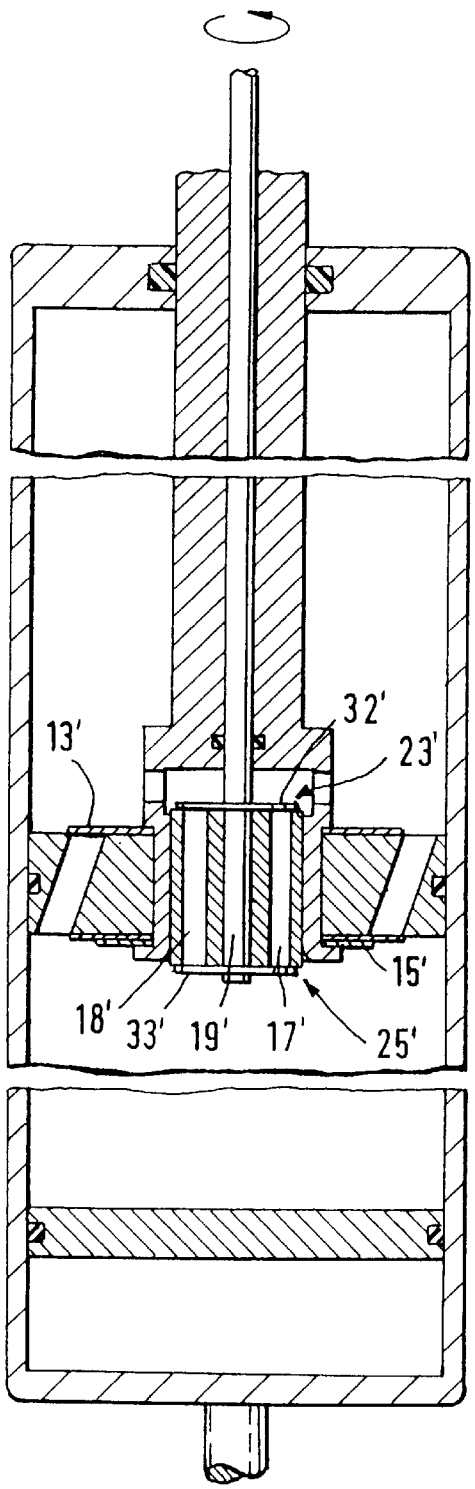
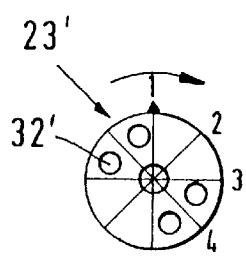
FIG. 5A
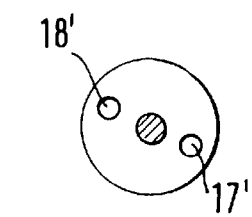
FIG. 5B
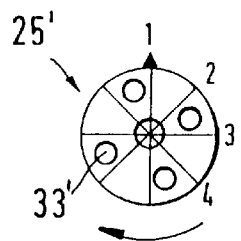
FIG. 5C

VIBRATION DAMPER OR SHOCK ABSORBER HAVING APPARATUS FOR DAMPING SPRING-MOUNTED WHEEL SUSPENSION SYSTEMS

BACKGROUND OF THE INVENTION

1. Field of the Invention

The present invention generally relates to an apparatus for damping spring-mounted wheel suspension systems, which apparatus comprises a cylinder filled with damping medium, a piston, and two work chambers, whereby the two work chambers are connected to one another by means of damping valves.

2. Background Information

Such a device is disclosed, for example, by German Laid Open Patent Application No. 38 27 538 A1. This apparatus uses two valve devices in a series arrangement which can be switched separately. The special arrangement of the rotary disc of the valve device requires individual parts which must be manufactured to very precise tolerances, to keep the leakage of the individual rotary disks at an acceptable level. An additional problem is that the flow volumes which can be achieved by the valve device may be totally insufficient in actual practice.

Alternatively, EPS 0 405 123 B1 discloses a two-way solenoid valve with bypass control, in which an actuatable valve disc, in connection with a number of non-return valves, closes or opens a bypass channel. For the two directions of flow there are two bypass channels which have a common control chamber, the inflow of which is controlled by the valve disc. Apart from the necessary bypass channels, the design and construction of which can be problematic, significant damping force fluctuations occur even with relatively low tolerances in the area of the control edges of the valve discs. With regard to this valve device, it should also be noted that only two switching stages are possible, and when the valve disc is closed, the maximum damping force is generated by the throttle bodies.

OBJECT OF THE INVENTION

The object of the present invention is to create an apparatus, the construction of which is significantly simpler, which apparatus controls the necessary flow volumes and is less sensitive to tolerances with regard to the damping force characteristics which should be maintained.

SUMMARY OF THE INVENTION

The present invention teaches that this object can be achieved by means of an apparatus comprising a cylinder filled with damping medium, a piston, and two work chambers, whereby the two work chambers can be connected to one another by means of damping valves. The apparatus further comprises at least one fluid connection and an actuator for control of the damping valves. The total design and construction of the valve device, in particular of the fluid channel, can essentially be simplified to a major extent, since there can be a functional connection or interaction between the non-return valves and the valve device which can control the throttling.

The overall design and construction of the valve device, in particular of the fluid channel, can therefore be simplified to a major extent by the combination and functional connection or interaction between the actuator and the valves. The valves, which valves are dependent on the direction of flow, can be provided with resistance, which valves can in turn be actively connected to the damping valves.

The present invention also teaches that the fluid connection can have two non-return valves which can preferably be coupled by means of the actuator. The coupling can be accomplished by means of a rigid connection between the respective non-return valve and the armature. For the purpose of such a rigid connection, the non-return valves can preferably be designed simply as disc valves.

Additionally, for the purpose of rigidly connecting the non-return valves, the non-return valves can be designed as disc valves, which disc valves are essentially provided with a greater or lesser degree of resistance. The non-return valves can be optionally placed in their active positions axially and/or rotationally.

In one variant embodiment, the non-return valve can be operationally connected to two valve seat surfaces, and the operation can be switched arbitrarily between the two valve seat surfaces, as necessary. The non-return valve represents a quasi-double valve, which can thus be kept particularly short.

Alternatively, the non-return valves can be mounted in a floating manner relative to the actuator, so that a valve movement into an open or closed position occurs independently of the actuator force, e.g. by means of a closing spring.

In accordance with an additional advantageous feature, the present invention teaches that the damping medium can travel the same flow distance for both directions of flow. The fluid connection can preferably be simplified and shortened. The throughput of the flow volume can also be increased while maintaining essentially the same size of the component.

With reference to an additional advantageous embodiment, the present invention teaches that the regulating distance of travel of the actuator is essentially greater than the valve distance of travel from the open position into the closed position of the non-return valves. Thus, the prestress of the disc valves can be increased, and at least to some extent, a continuously-adjustable damping force characteristic can be achieved, whereby in the maximum position of the actuator, a hard damping force characteristic is possible for both directions.

Alternatively, the prestress of the disc valves can be increased, and at least to some extent, a continuously-adjustable damping force characteristic can be achieved, whereby in the limit positions of the actuator, an increased damping force setting is possible in one direction.

The present invention further teaches that the flow connection can advantageously be provided with a damping valve. For example, the damping valve can be realized as a constant throttle. It is thereby appropriate, to reduce the actuation forces, if the valve which can be moved into its operating position by the actuator is piloted or controlled by a pilot valve.

The entire valve device is essentially sufficiently compact such that the fluid connection to the valve device can be located inside the piston. The present invention teaches that the general problem in similar known devices is noise which is generated during switching processes in valve devices, in particular when there is a change from a hard setting to a soft setting. This problem of noise can be solved by making it possible to switch the actuator if the pressure on the inflow side in the closed non-return valve drops below a defined level. As an additional measure to control the flow volume between the two work chambers, the fluid connection can be realized in the form of a central channel.

One aspect of the present invention resides broadly in a shock absorber for a motor vehicle, which shock absorber comprises a cylinder and an outer surface; the cylinder comprising a substantial portion of the outer surface of the shock absorber; the cylinder comprising a first apparatus for attaching the cylinder to one of: a wheel suspension and a support structure of the motor vehicle; the cylinder defining a chamber therein, the chamber containing a damping fluid; a piston rod; the piston rod for sealingly projecting into the cylinder and being axially displaceable with respect to the cylinder; the piston rod having a longitudinal axis defining an axial direction parallel to the longitudinal axis of the piston rod; the piston rod having a first end and a second end; the first end of the piston rod being disposed substantially adjacent one of: the wheel suspension and the support structure of the motor vehicle; a piston body; the piston body being attached to the second end of the piston rod; the piston body being slidably disposed within the cylinder to sealingly divide the chamber into first and second chambers; the piston body having a first side and a second side; the first side of the piston body facing toward the piston rod; the second side of the piston body facing opposite the first side; the first side of the piston body being adjacent the first chamber; the second side of the piston body being adjacent the second chamber; an apparatus for permitting flow of damping fluid between the first chamber and the second chamber; the apparatus for permitting flow of fluid between the first and second chambers comprising a flow channel comprising valves; the valves comprising at least one valve; the at least one valve having a flow resistance being dependent on the direction of flow of damping fluid through the at least one valve, the dependence on the direction of flow comprising a first flow resistance of the at least one valve in a first flow direction and a second flow resistance in a second flow direction of the at least one valve; the first flow resistance in the first flow direction of at least one valve being substantially different from the second flow resistance in the second flow direction of the at least one valve; and a device for modifying the flow resistance of the at least one valve to modify at least one of: the first flow resistance in the first flow direction of the at least one valve and the second flow resistance in the second flow direction of the at least one valve.

BRIEF DESCRIPTION OF THE DRAWINGS

The present invention is explained in greater detail below with reference to the embodiments illustrated in the accompanying figures, in which:

FIG. 5 shows a valve device with a rigid coupling of the non-return valves and rotational actuator function;

FIGS. 5A, 5B, and 5C show details of the valve device as shown in FIG. 5;

DESCRIPTION OF THE PREFERRED EMBODIMENT

Figure 1:
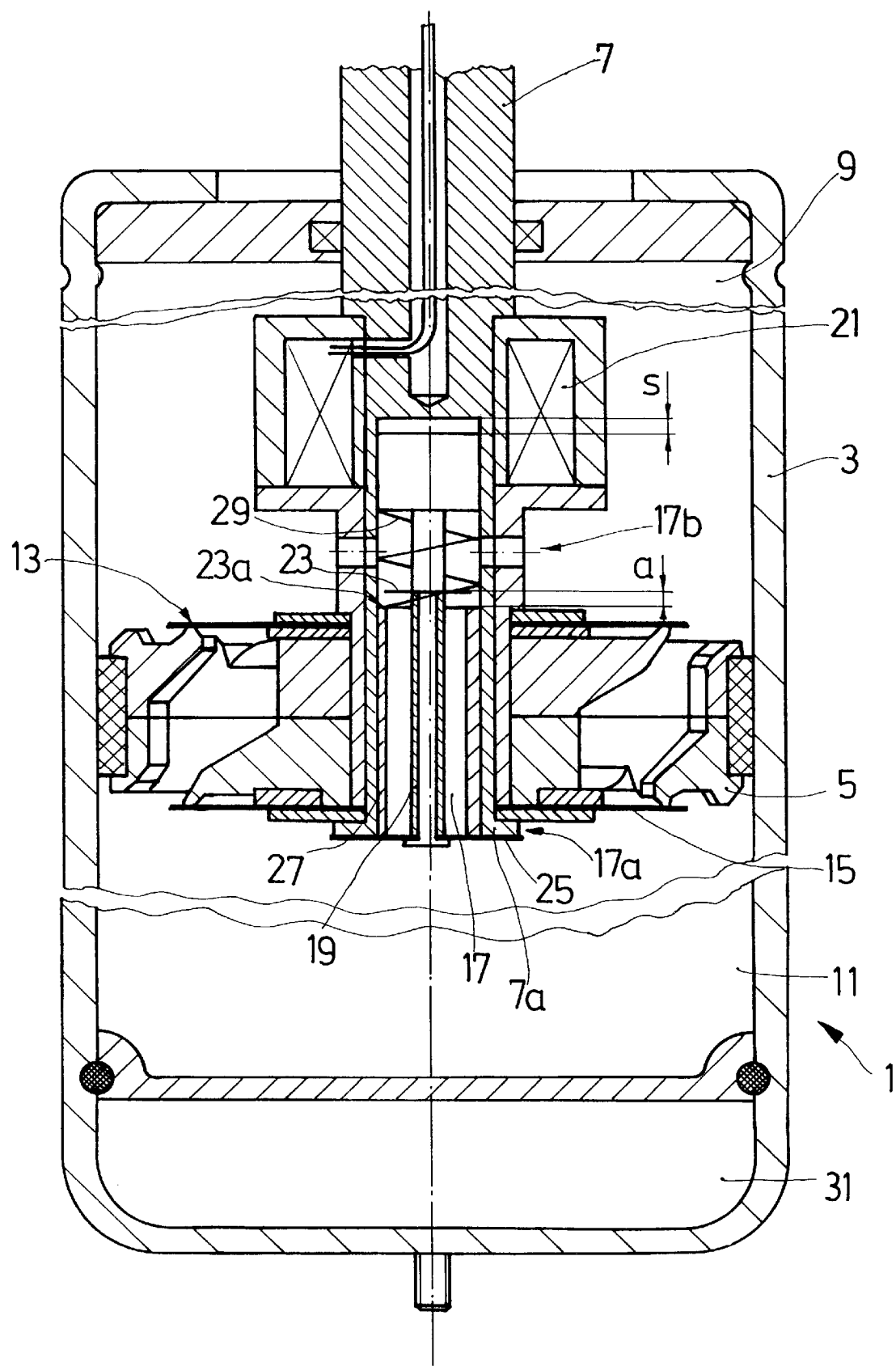
FIG. 1 shows a valve device with a rigid coupling of the non-return valves.

FIG. 1 shows an apparatus 1 for damping spring-mounted wheel suspension systems, for example, in the form of a single-tube vibration damper. The apparatus 1 comprises a cylinder 3 filled with damping medium, which cylinder 3 can be divided into an upper work chamber 9 and a lower work chamber 11 by a piston 5 on a piston rod 7. The two work chambers 9, 11 can be connected by means of damping valves 13, 15 for the decompression and compression direction of the apparatus 1. The piston 5 can also have a fluid connection 17, which fluid connection 17 can connect the two work chambers 9, 11, by means of an actuator 19. The actuator 19 can be actuated by a magnet coil 21 in connection with valves 23, 25. The valves 23, 25 can act as a function of the direction of flow and can preferably be parallel to the damping valves 13, 15.

The fluid connection 17 can preferably be formed by a central channel inside the piston 5 or inside the piston rod 7, whereby the identical flow distance can be used for both directions of flow. There can preferably be a connection 17a for the fluid connection on the end surface of the piston 5, while a second connection can preferably be formed by radial borings 17b in the piston rod 7.

In accordance with an embodiment of the present invention, therefore, the fluid connection 17 can comprise a channel located in either the piston 5 or in the piston rod 7, or the fluid connection 17 can be located and extend through at least a portion of both the piston 5 and the piston rod 7. Because the fluid connection 17 can be used for both directions of flow, the flow distance can be identical for both compression and decompression. Damping fluid from work chamber 9 can flow through radial borings or holes 17b and thereby into fluid connection 17 and through the disc valve 25. Similarly, damping fluid from work chamber 11 can flow through connection 17a and thereby into fluid connection 17 and then out of the radial holes 17b.

The disc valve 23 inside the preferably hollow piston rod 7 can have a valve seat surface 23a, which valve seat surface 23a can be formed by a friction-set, pressed-in, or inserted tube body 27. The other disc valve 25 can be in contact with a closing head 7a, which closing head 7a can be shaped on the piston rod 7. In accordance with an embodiment, the closing head 7a can preferably serve to fasten the piston 5 to the piston rod 7. A compression spring 29 can apply a prestress to the actuator 19.

In addition, in a preferred embodiment of the present invention, there can be stops or pins which can support the disc valve 23 and thereby essentially prevent the disc valve 23 from moving beyond its valve seat surface 23a into fluid connection 17.

In accordance with an embodiment of the present invention, therefore, an upper portion of the inserted tube body 27 can preferably form the valve seat surface 23a for disc valve 23. Likewise, the closing head 7a of the piston rod can form a contact or valve seat surface for the disc valve 25.

When there is a piston rod stroke during which the piston rod 7 is essentially inserted into the cylinder 3, the damping medium can essentially flow through the damping valve 13 independently, regardless of the actuator position. The volume of fluid in lower chamber 11 due to the insertion of the piston rod 7 can be compensated for by a gas-filled equalization chamber 31. When the magnet coil 21 is energized, the actuator 19 can be essentially moved into the illustrated position, as shown in FIG. 1. The actuator 19 has thereby essentially travelled the distance of portion "a" of the regulating distance of travel. A harder characteristic can preferably be set for the compression direction, since only the damping valve 13 is active. When the piston rod 7 moves in the opposite direction, i.e. out of the cylinder 3, the damping medium can essentially flow through the radial holes 17*b*, then, by means of the open disc valve 23, into the central channel of the fluid connection 17, and the damping medium can encounter the only lightly prestressed disc valve 25. Together with the damping medium which flows through the damping valve 15, a softer characteristic can be set in the decompression direction.

As shown in FIG. 1, therefore, in accordance with a preferred embodiment of the present invention, during compression, the damping medium can flow essentially only through damping valve 13. The compression direction can, in at least some embodiments, therefore, have a harder damping characteristic because essentially only the damping valve 13 can be in the active or open position during compression. During decompression, however, the damping medium can flow through damping valve 15 as well as through radial holes 17*b*, and therethrough, into the channel of fluid connection 17 due to an open position of the disc valve 23. During decompression, therefore, there can be a softer damping characteristic because of the combination of damping flow through damping valve 15, as well as through disc valve 25.

As illustrated in FIG. 1, there is still a portion "s" of the valve regulating distance available which, by means of the previous closed position of the valve 25, makes possible an additional prestress of the disc valve 25, so that the valve disc 25 can assume a throttle function which can be superimposed on, and can reinforce the damping valve 15. For the decompression direction, a damping force can therefore be set which essentially appropriately equals the damping force setting in the compression direction.

To summarize, in accordance with a preferred embodiment of the present invention, when the magnet coil 21 is fully energized, the actuator 19 can travel through the portion "s", as shown in FIG. 1. As a result, there can be an additional prestress of the disc valve 25, over and above the prestress present in the position of disc valve 25, as shown in FIG. 1. The disc valve 25, thereby, can function as a reinforcing damping function, in addition to the damping function of the damping valve 15. Therefore, because of the additional prestress of disc valve 25, during the decompression direction, the damping medium can flow essentially only through damping valve 15, except at very high pressures. Such a configuration can provide essentially similar damping characteristics for both the decompression and compression directions because, during compression, the damping medium can flow only through damping valve 13. And, similarly, during decompression, preferably as a result of the additional prestress of disc valve 25, the damping fluid can essentially flow only through damping valve 15.

The elements as described with reference to FIG. 1 may be considered as elements that are interchangeable with the elements as described below with reference to FIGS. 2 and 3. Such elements, although not specifically mentioned with reference to FIGS. 2 and 3, may be assumed with reference to FIGS. 2 and 3. Such elements include, for example, radial holes 17*b*, the first fluid connection 17*a*, work chambers 9, 11, and tube body 27.

Figure 2:
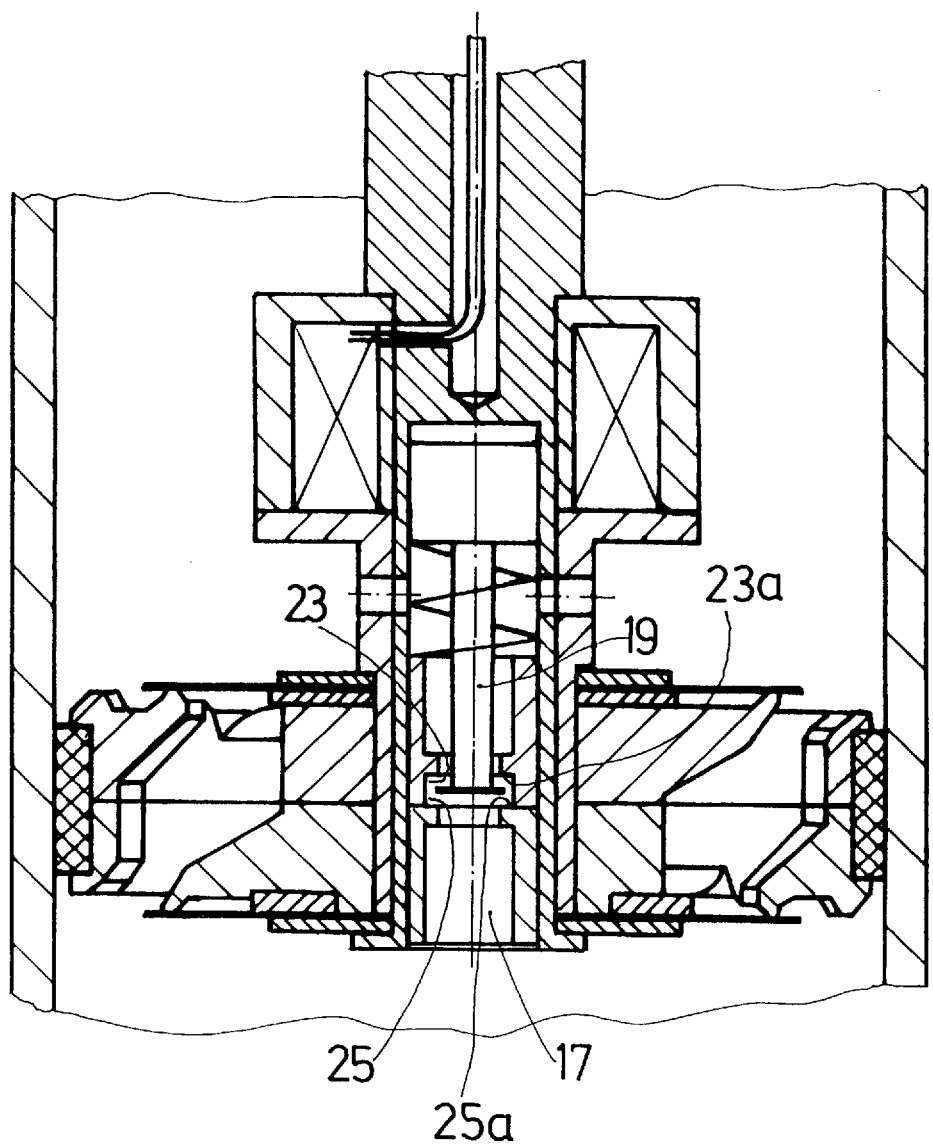
FIG. 2 shows a valve device with a non-return valve between two valve seat surfaces.

FIG. 2 illustrates a variant of FIG. 1, in which the two non-return valves (23, 25 in FIG. 1) can preferably be combined in the same space. The disc valve 23, 25 can be operationally connected between two valve seat surfaces 23*a*, 25*a*, with which the non-return valve 23, 25 comes into contact alternately, and assumes a closed position in the one direction and an open position for the other direction. However, an intermediate valve position is also possible in which there is a softer damping force setting for both flow directions of the fluid connection 17. The actuator 19 can thus be made particularly short and lightweight. It should be apparent that, in accordance with the preferred embodiment of the present invention, as shown in FIG. 2, the regulating distance "s", as shown in FIG. 1, of the actuator 19 is substantially greater than the valve distance "a", as shown in FIG. 1.

In accordance with a preferred embodiment of the present invention, in summary, the actuator 19 can essentially move the combined disc valves 23, 25 into their active or open positions. The actuator 19, as shown in FIG. 2, can open disc valve 23 by essentially pulling the disc valve 23 away from its valve seat surface 23*a*. Accordingly, the actuator 19 can open disc valve 25 by essentially pulling the disc valve 25 away from its valve seat surface 25*a*. Furthermore, the combined disc valves 23, 25, as shown in FIG. 2, can also be placed in an intermediate position whereby the combined disc valves 23, 25 can be located essentially between the valve seat surfaces 23*a*, 25*a*. In this intermediate position, a softer damping characteristic is essentially possible for both the decompression and compression directions because when the disc valves 23, 25 are in the intermediate position, the disc valves 23, 25 can essentially provide less resistance to the flow of damping medium into fluid connection 17. In the intermediate position of the disc valves 23, 25, therefore, the portion "s", as shown in FIG. 1, i.e. the valve regulating distance of the actuator 19, is essentially greater than the portion "a", also shown in FIG. 1, i.e. the distance travelled by disc valve 23, 25.

Figure 3:
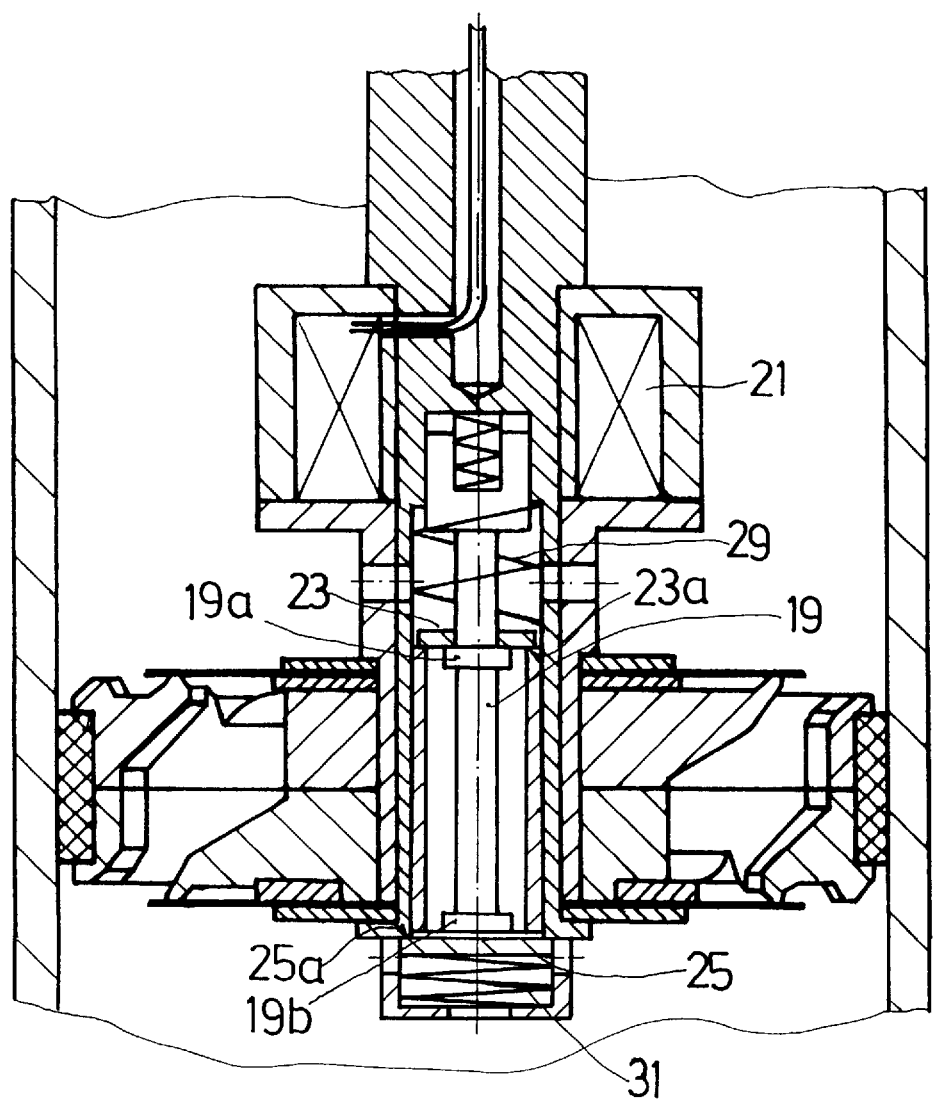
FIG. 3 shows a valve device with non-return valves mounted in a floating manner.

As an additional alternative, FIG. 3 illustrates a variant of the present invention in which the closing force of the check valves 23, 25 can preferably be independent of the actuator force. The actuator 19 essentially only opens the respective valve 23, 25, while the closing is performed by separate closing springs 29, 31. The non-return valves 23, 25 can be mounted so that they can float in relation to the actuator 19, and can be moved by means of contact surfaces 19*a*, 19*b* of the actuator 19.

In accordance with a preferred embodiment of the present invention, therefore, the actuator 19 can control the positions of contact surface 19*a* for check valve 23. Similarly, the actuator 19 can control the positions of contact surface 19*b* for the check valve 25. Accordingly, each of the disc or check valves 23, 25 can be slideably moveable with respect to the actuator 19, which actuator 19 can thereby individually control the disc valves 23, 25 into their open positions. However, the closing of the disc valves 23, 25 can preferably be controlled by their respective closing springs 29, 31.

When the magnet coil 21 is not energized, the spring 29 can essentially push the disc valve 23 with the maximum spring force into the closed position. A harder damping force setting can be assumed in this switched position in the decompression direction as well as in the compression direction. When the magnet coil 21 is energized, the prestress or bias of the spring 29 on the disc valve 23 is essentially eliminated, so that the disc valve 23 can act as an essentially pure non-return valve.

A setting of the actuator 19 is also possible in which, when the actuator 19 assumes an intermediate position, so that both disc valves 23, 25 are lifted off their seat surfaces 23*a*, 25*a*, so that there is a rather hard damping force setting for both flow directions when the distance between the contact surfaces 19*a*, 19*b* is less than or equal to the distance between the support surfaces 23*a*, 25*a*. If the distance between the contact surfaces 19*a*, 19*b* of the actuator 19 is greater than the distance between the support surfaces 23*a*, 25*a*, there is a softer damping force characteristic in an intermediate position of the actuator 19, since in that case, both non-return valves are preferably open.

In an embodiment of the present invention, as shown in FIG. 3, the actuator 19 can include contact surfaces 19*a*, 19*b*, which contact surfaces 19*a*, 19*b* can be located in between and in contact with disc valves 23, 25, respectively. When the actuator 19 is energized, the actuator 19 can lift the disc valve 23 off its contact surface 19*a* or the actuator 19 can lift the disc valve 25 off its contact surface 19*b*. By adjusting the contact surfaces 19*a*, 19*b*, the actuator 19 can thereby provide either a softer or a harder damping characteristic for both flow directions.

Figure 4:
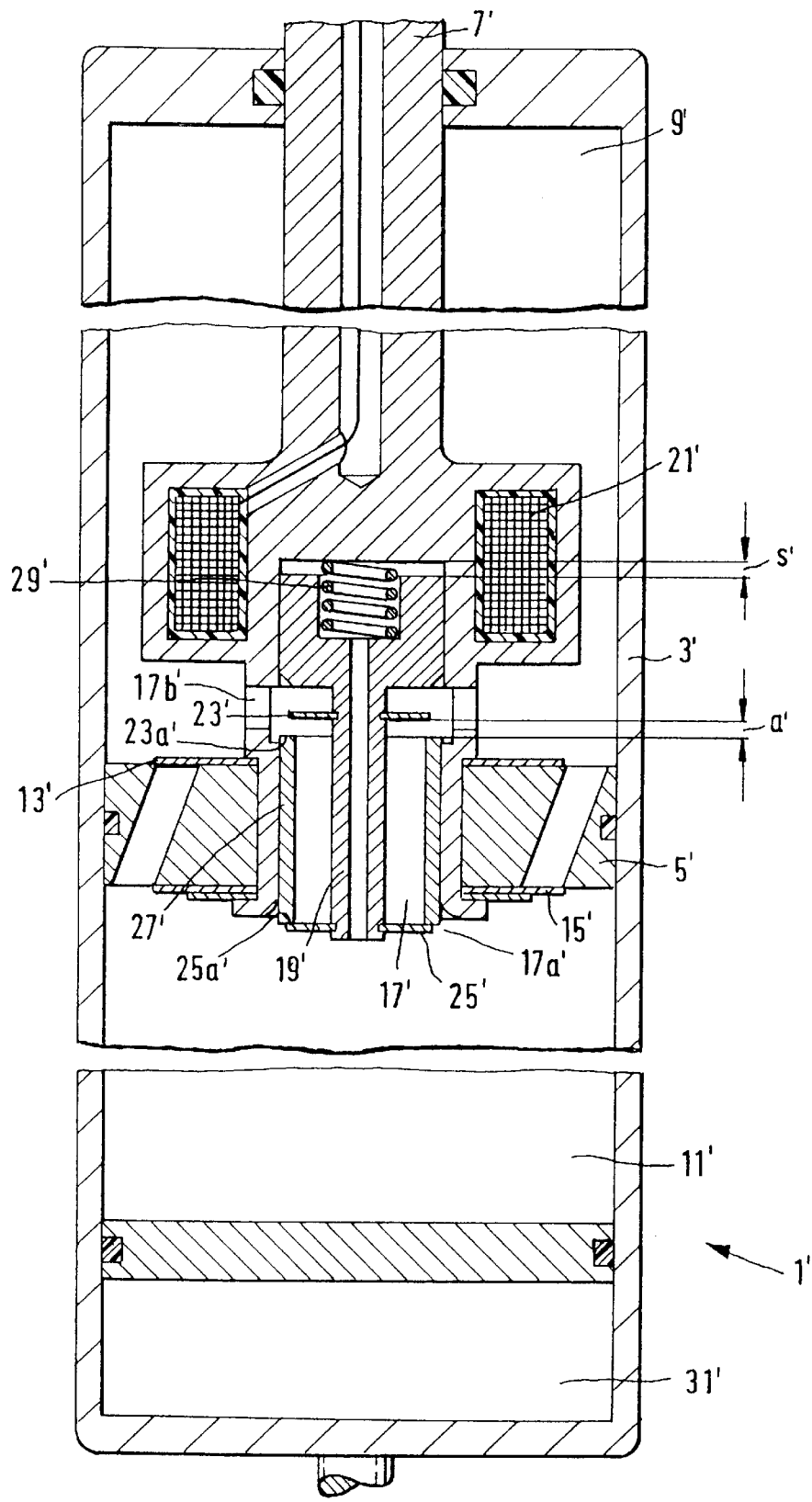
FIG. 4 shows a valve device with a rigid coupling of the non-return valves and axial actuator function.

FIG. 4 shows an apparatus 1' for damping spring-mounted wheel suspension systems, for example in the form of a single-tube vibration damper. The apparatus 1' generally includes a cylinder 3' filled with damping medium, which cylinder 3' can be divided into an upper work chamber 9' and lower work chamber 11' by a piston 5' on a piston rod 7'. The two work chambers 9', 11' can be connected by means of damping valves 13', 15' for the decompression and compression direction of the apparatus 1'. The piston 5' can also preferably have a fluid connection 17', which fluid connection 17' can connect the two work chambers 9', 11', by means of an actuator 19'. The actuator 19' can be actuated by a magnet coil 21' in connection with valves 23', 25'. The valves 23', 25' can act as a function of the direction of flow and can preferably be parallel to the damping valves 13', 15'.

The fluid connection 17' can be formed by a central channel inside the piston 5' or inside the piston rod 7', whereby the identical flow distance can be used for both directions of flow. There can be a connection 17*a*' for the fluid connection on the end surface of the piston 5', while a second connection 17*b*' can be formed by radial borings 17*b*' in the piston rod 7'.

The disc valves 23' and 25' inside the hollow piston rod 7' can have valve seat surfaces 23*a*', 25*a*' which can be formed by a friction-set, pressed-in, or inserted tube body 27'. A compression spring 29' can essentially apply a prestress to the actuator 19'.

When there is a piston rod stroke during which the piston rod 7' is essentially inserted into the cylinder 3', the damping medium can flow through the damping valve 13' independently, regardless of the actuator position. The volume of the fluid in chamber 11' due to the insertion of the piston rod 7' can be compensated for by a gas-filled equalization chamber 31'. When the magnet coil 21' is energized, the actuator 19' can be moved into the illustrated position. The actuator 19' has essentially thereby travelled the portion "a'" of the regulating distance. A high characteristic can be set for the compression direction, which high characteristic can essentially be determined by the damping valve 13'. When the piston rod 7' moves in the opposite direction, i.e. in the decompression direction, the damping medium can flow through the radial holes 17*b*' by means of the open disc valve 23' into the central channel of the fluid connection 17', and the damping medium can encounter the disc valve 25'. Simultaneously with the damping medium which flows through the damping valve 15', a lower characteristic can be set in the decompression direction.

As illustrated in FIG. 4, there is still a portion "s'" of the valve regulating distance available, which portion "s'", by means of the previous or current closed position of the valve 25', can make possible an additional prestress of the disc valve 25', so that disc valve 25' can have an increased throttle function which can act in parallel to the damping valve 15'. When the magnet coil 21' is de-energized, there can be a reverse function of the actuator/valve unit.

Therefore, in a preferred embodiment of the present invention, the actuator 19' can essentially travel the portion "s'", or the available valve regulating distance, as illustrated in FIG. 4. When the actuator 19' has essentially travelled through the portion "s'", there can be an additional prestress of the disc valve 25', over and above the prestress present in the position of disc valve 25', as shown in FIG. 4. The disc valve 25' can thereby essentially reinforce damping valve 15' and superimpose a throttle function on damping valve 15'. The actuator 19' can also perform essentially the reverse function of the disc valve 25' when the magnet coil 21' is de-energized.

FIG. 5 illustrates a variant of FIG. 4, in which the coupled disc non-return valves (23', 25' in FIG. 4) can be provided with passage cross sections 32', 33', which coupled disc non-return valves 23', 25' can be set by means of a rotationally symmetrical actuating function of the actuator 19' in different hydraulically active positions. For this purpose, the non-return valves 23', 25' can preferably be connected in fluidic inversion to the fluid connections 17', 18'. The non-return valves 23', 25' can thereby be oriented with their passage cross sections 32', 33' in relation to one another so that several different active positions can be realized.

FIGS. 5A, 5B, and 5C, for example, illustrate the disc non-return valves 23', 25' each with 4 passage cross sections 32', 33' in combination with the fluid connections 17', 18'. Illustrated by way of example is the resistance-less active position of non-return valve 23' in connection with the closing function (piston rod insertion direction) or opening function (piston rod expulsion position) of the non-return valve 25'. With the non-return valve configuration coupled in this manner, 4 different hydraulic active positions are essentially possible, which can be actuated, for example, by using a stepper motor drive system.

Therefore, in accordance with a preferred embodiment of the present invention, as shown in FIGS. 5A–5C, the disc valve 23' can preferably comprise passage cross sections 32'. Similarly, the disc valve 25' can preferably comprise passage cross sections 33'. The passage cross sections 32' of the disc valve 23' essentially make possible a flow of fluid from disc valve 23' to fluid connections 17', 18'. The passage cross sections 32' of the disc valve 23' and the passage cross sections 33' of the disc valve 25' can be configured to be essentially in an inverse relationship with one another with respect to fluid connections 17', 18'. Each of the passage cross sections 32', 33' can also be essentially variably adjusted whereby the passage cross sections 32', 33' can be set at partially open positions.

In accordance with a preferred embodiment of the present invention, further regarding FIGS. 5A–5C, the actuator 19' can preferably rotate symmetrically. Upon the rotation of the actuator 19', the disc valves 23', 25' can thereby rotate in relation to one another. The passage cross sections 32', 33' of each of the disc valves 23', 25' thereby make possible at least four different positions for the flow of fluid through the channel or fluid connections 17', 18'. As shown by example in FIG. 5A, the disc valve 23' is essentially in its active or open function, as such, the disc valve 23' provides essentially no resistance to the flow of damping fluid.

Figure 6:
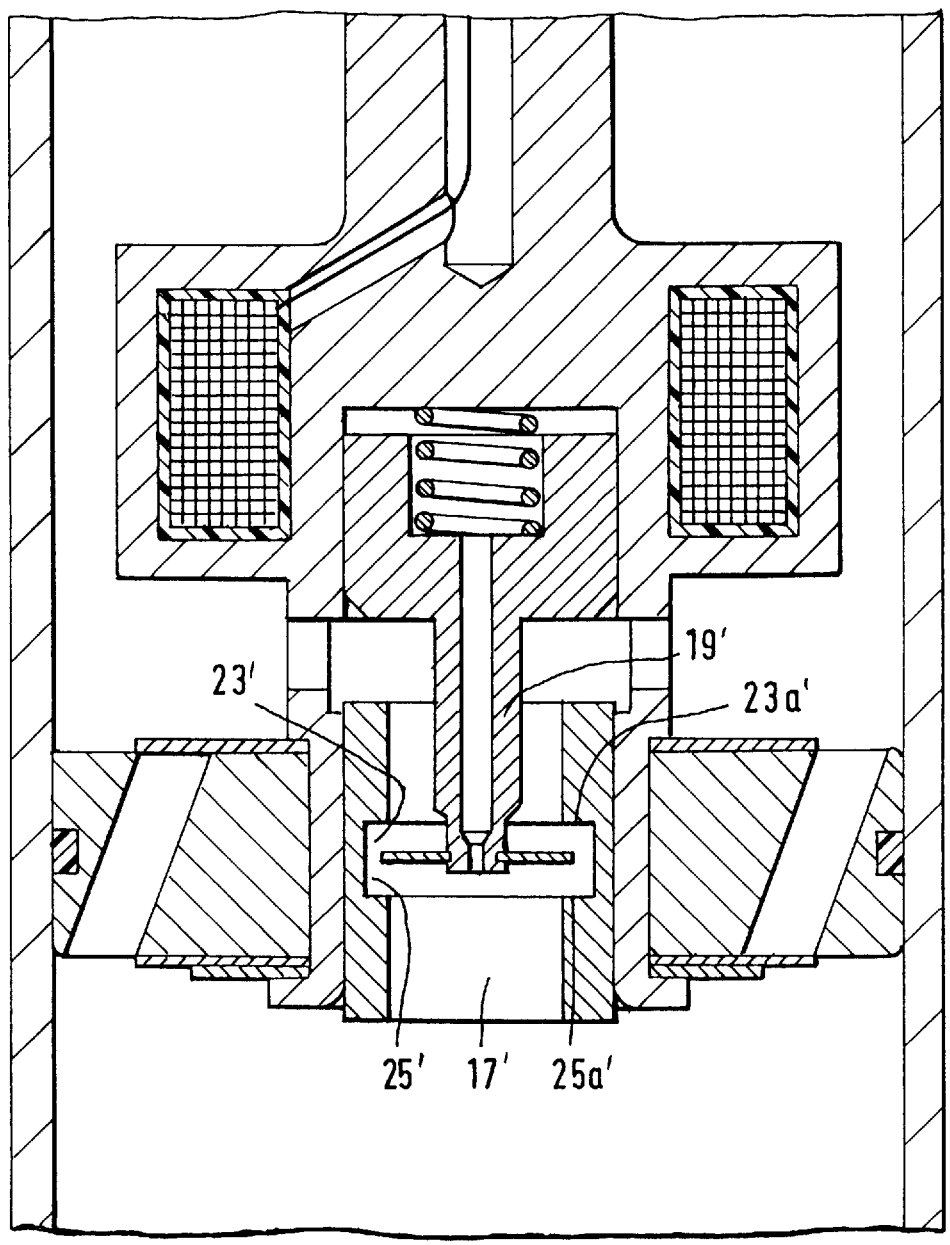
FIG. 6 shows a valve device with a non-return valve between two valve seat surfaces.

FIG. 6 illustrates an additional variant of FIG. 4, in which the two non-return valves (23', 25' in FIG. 4) are combined in the same space. The coupled disc valve is operationally connected between two valve seat surfaces 23*a*', 25*a*', with which the non-return valve comes into contact alternately, and assumes a closed position in the one direction and an open position in the other direction. However, any desired intermediate valve position is also possible in which there is a lower damping force setting for both flow directions of the fluid connection 17'. The actuator 19' can thus be made particularly short and lightweight. Of course, the regulating distance "s'" of the actuator 19' is greater than the valve distance "a'".

Figure 7:
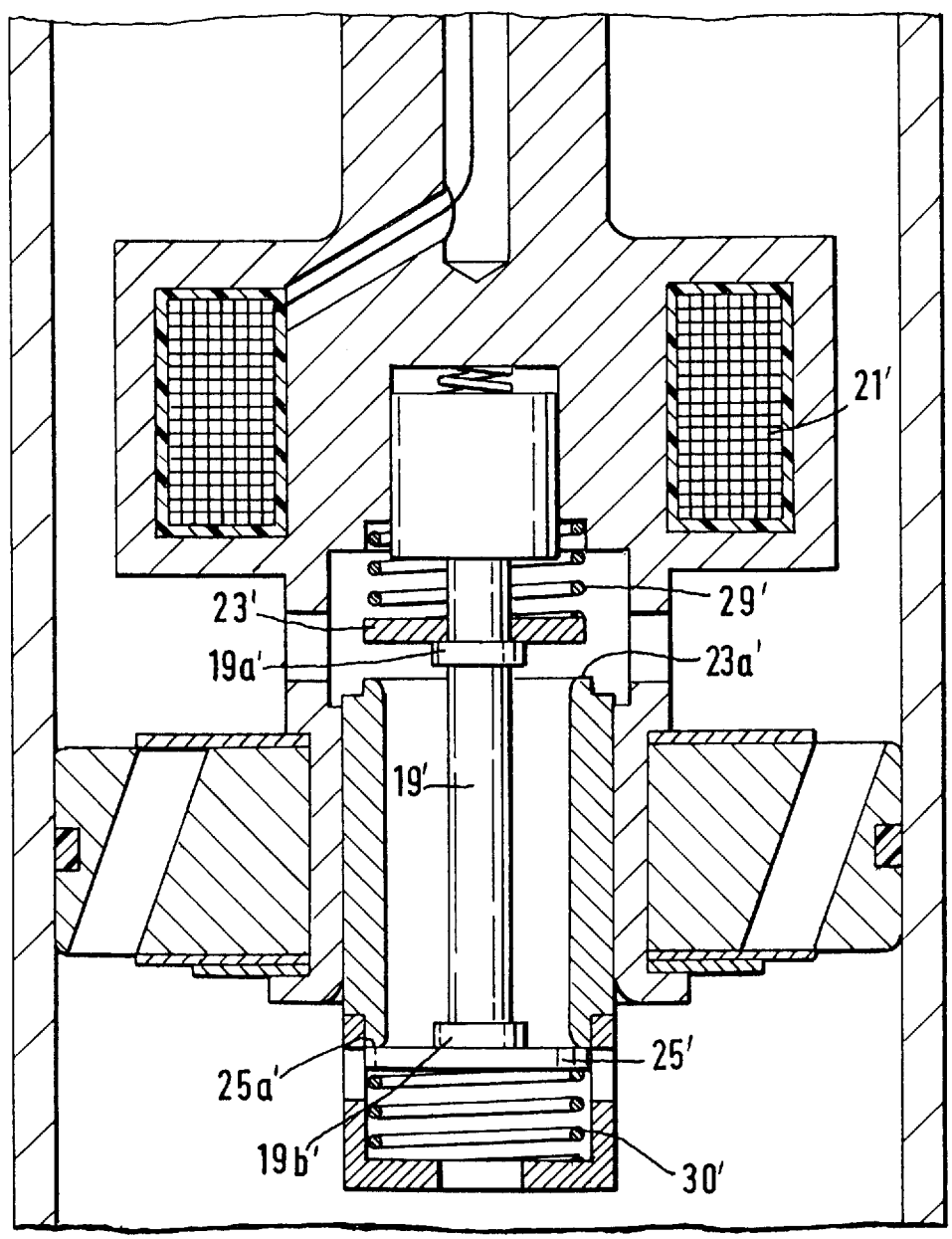
FIG. 7 shows a valve device with non-return valves mounted in a floating manner.

As shown in FIG. 7, the variant of the object of the present invention is illustrated wherein the closing force of the check valves 23', 25' is independent of the actuator force. The actuator 19' can essentially open only the respective valve, while the closing can be performed by separate closing springs 29', 30'. The non-return valves 23', 25' can be mounted so that they float in relation to the actuator 19' and are moved by means of contact surfaces 19a', 19b' of the actuator 19'.

When the magnet coil 21' is not energized, the spring 29' preferably pushes the disc valve 23' into the closed position. In this setting, there is a high damping force setting in the decompression direction and a low damping force setting in the compression direction. When the magnet coil 21' is energized, the closing force of the spring 29' on the disc valve 23' can be essentially eliminated, so that the disc valve 23' can act as a non-return valve with low resistance.

A setting of the actuator 19' is also possible in which the actuator 19' assumes an intermediate position, so that both disc valves 23', 25' are lifted off their seat surfaces 23a', 25a'. In this case, in which the distance between the contact surfaces 19a', 19b' of the actuator 19' is greater than the distance between the support surfaces 23a', 25a', in an intermediate position of the actuator 19' there is a soft damping force characteristic in both directions of flow, since in that case, both non-return valves are open.

One feature of the invention resides broadly in the apparatus for damping spring-mounted wheel suspension systems, comprising a cylinder filled with damping medium and divided by a piston on a piston rod into two work chambers, whereby the two work chambers are connected to one another by means of damping valves, at least one additional fluid connection provided with a non-return valve between the two work chambers, which has an actuator which can be switched as desired inside a valve device with a damping force adjustment which acts in opposite directions for the two directions of flow, characterized by the fact that at least one non-return valve 23, 25 is moved into its operating position by the actuator 19.

Another feature of the present invention resides broadly in the apparatus characterized by the fact that at least one valve 23, 25 which is dependent on the direction of flow and is provided with resistance, is moved into its operating position by the actuator 19.

Still another feature of the invention resides broadly in the apparatus characterized by the fact that the coupled disc valves can be placed in their active positions optionally axially and/or rotationally by the actuator.

A further feature of the invention resides broadly in the apparatus characterized by the fact that the non-return valve is in an operational connection with two valve seat surfaces, between which the operation can be switched as desired.

Another feature of the invention resides broadly in the apparatus characterized by the fact that the fluid connection 17 is provided with a damping valve.

Another feature of the invention resides broadly in the apparatus characterized by the fact that the fluid connection 17 has two non-return valves 23, 25 which are coupled by means of the actuator 19.

Yet another feature of the invention resides broadly in the apparatus characterized by the fact that the non-return valves 23, 25 are designed as disc valves.

Still another feature of the invention resides broadly in the apparatus characterized by the fact that the non-return valve is in an operational connection with two valve seat surfaces, between which the operation can be switched as desired.

A further feature of the invention resides broadly in the apparatus characterized by the fact that the non-return valves 23, 25 are mounted in a floating manner relative to the actuator 19, so that a valve movement into an open or closed position takes place independently of the actuator force.

Another feature of the invention resides broadly in the apparatus characterized by the fact that the damping medium travels the same flow distance in the fluid connection 17 for both directions of flow.

Yet another feature of the invention resides broadly in the apparatus characterized by the fact that the regulating distance a+s of the actuator 19 is longer than the valve distance a from the open position into the closed position of the non-return valves 23, 25.

Still another feature of the invention resides broadly in the apparatus characterized by the fact that the fluid connection 17 is located with the valve device 17, 23, 25 inside the piston 5.

A further feature of the invention resides broadly in the apparatus characterized by the fact that the actuator 19 can be switched when the pressure on the inflow side of the closed non-return valve 23, 25 drops below a defined level.

Another feature of the invention resides broadly in the apparatus characterized by the fact that the fluid connection 17 is designed as a central channel.

Examples of stepper motor drive systems which may be utilized in accordance with the present invention may be disclosed in the following U.S. Pat. Nos.: No. 5,182,685 entitled "Stepper Motor Torque Variance Compensation Using Varied Applied Voltage" to Seagate Technology; No. 5,206,571 entitled "Stepper Motor Controllers" to Motorola; No. 5,225,756 entitled "Stepper Motor Driver Circuit" to Coutu; and No. 5,256,943 entitled "Zero Adjustment Shaft Encoder Control for Stepping Motors" to NCR Corporation.

Examples of linear solenoids which may be utilized in accordance with the present invention may be disclosed in the following U.S. Pat. Nos.: No. 5,178,053 entitled "Electronic Pilot Positioner" to Johnson; No. 5,186,204 entitled "Linear Solenoid Valve Apparatus" to Aisin; No. 5,202,658 entitled "Linear Proportional Solenoid" to South Bend Controls, Inc.; No. 5,247,965 entitled "Linear Solenoid Valve Apparatus" to Aisin; and No. 5,138,291 entitled "Proportional Solenoid Actuator" to AIL Corporation.

Examples of rotational valve devices which may be utilized in accordance with the present invention may be disclosed in the following U.S. Pat. Nos.: No. 5,238,022 entitled "Internal Rotary Valve Actuator System" to Montana Co.; No. 5,259,589 entitled "Stop for Rotational Actuators" to Posner; No. 5,283,495 entitled "Rotary Actuator for Determining a Flow Cross Section of a By-pass Line around a Valve" to Bosch; and No. 5,348,271 entitled "Locking Device" to Bettis Corporation.

Examples of shock absorber assemblies and components associated therewith which may be utilized with the embodiments of the present invention may be disclosed in the following U.S. Pat. Nos.: No. 4,650,042 entitled "Hydraulic Adjustable Shock Absorber" to Knecht et al.; No. 4,723,640 entitled "Adjustable Hydraulic Vibration Damper" to Beck; No. 4,749,069 entitled "Vibration Damper for Motor Vehicles Having an Arrangement for Varying Damping Thereof" to Knecht et al.; No. 5,301,776 entitled "Hydraulic Adjustable Vibration Damper" to Beck; and No. 4,986,393 which issued to Preukschat et al. on Jan. 22, 1991.

The appended drawings in their entirety, including all dimensions, proportions and/or shapes in at least one embodiment of the invention, are accurate and are hereby included by reference into this specification.

All, or substantially all, of the components and methods of the various embodiments may be used with at least one embodiment or all of the embodiments, if more than one embodiment is described herein.

All of the patents, patent applications and publications recited herein are hereby incorporated by reference as if set forth in their entirety herein.

The corresponding foreign patent publication applications, namely, Federal Republic of Germany Patent Application No. P 44 21 908.3, filed on Jun. 24, 1994, having inventor Alfred Preukschat, and DE-OS P 44 21 908.3 and DE-PS P 44 21 908.3, are hereby incorporated by reference as if set forth in their entirety herein.

The invention as described hereinabove in the context of the preferred embodiments is not to be taken as limited to all of the provided details thereof, since modifications and variations thereof may be made without departing from the spirit and scope of the invention.

What is claimed is:

1. A shock absorber for a motor vehicle, said shock absorber comprising:

a cylinder;

an outer surface;

said cylinder comprising a substantial portion of said outer surface of said shock absorber;

said cylinder comprising an arrangement for attaching said cylinder to one of: a wheel suspension and a support structure of a motor vehicle;

said cylinder defining a chamber therein, said chamber containing a damping fluid;

a piston rod;

said piston rode for sealingly projecting into said cylinder and being axially displaceable with respect to said cylinder;

said piston rod having a longitudinal axis defining an axial direction parallel to said longitudinal axis of said piston rod;

said piston rod having a first end and a second end;

said first end of said piston rod being disposed substantially adjacent one of: said wheel suspension and said support structure of a motor vehicle;

a piston body;

said piston body being attached to said second end of said piston rod;

said piston body being slidably disposed within said cylinder to sealingly divide said chamber into first and second chambers;

said piston body having a first side and a second side;

said first side of said piston body facing toward said piston rod;

said second side of said piston body facing opposite said first side;

said first side of said piston body being adjacent said first chamber;

said second side of said piston body being adjacent said second chamber;

an arrangement to permit flow of damping fluid between said first chamber and said second chamber;

said arrangement to permit flow of damping fluid between said first and second chambers comprising a first flow channel;

said arrangement to permit flow of damping fluid between said first and second chambers comprising a second flow channel;

a valve arrangement;

said valve arrangement being disposed within said second flow channel;

an actuator;

said actuator being configured and disposed to position said valve arrangement into at least one operating position;

said valve arrangement comprising a first disc valve and a second disc valve;

said first disc valve being connected to said actuator;

said second disc valve being connected to said actuator;

said first disc valve and said second disc valve being coupled together by said actuator;

said first disc valve and said second disc valve being configured and disposed to be displaced together by said actuator;

said valve arrangement having a flow resistance being dependent on the direction of flow of damping fluid through said valve arrangement;

said valve arrangement having a first flow resistance in a first flow direction of damping fluid and a second flow resistance in a second flow direction of damping fluid; and said actuator being configured to modify at least one of: said first flow resistance in said first flow direction of said valve arrangement and said second flow resistance in said second flow direction of said valve arrangement.

2. The shock absorber according to claim 1, wherein said actuator is configured to essentially limit said flow of damping fluid through said valve arrangement in one flow direction.

3. The shock absorber according to claim 2, wherein:

said first disc valve having a flow resistance in said first flow direction;

said flow resistance of said first disc valve in said first flow direction for essentially limiting flow of damping fluid through said first disc valve in said first flow direction;

said second disc valve having a flow resistance in said second flow direction; and said flow resistance of said second disc valve in said second flow direction for essentially limiting flow of damping fluid through said second disc valve in said second flow direction.

4. The shock absorber according to claim 3, wherein:

said first disc valve being positionable into at least one of: an open position and a closed position; and said second disc valve being positionable into at least one of: an open position corresponding to said closed position of said first disc valve, and a closed position corresponding to said open position of said first disc valve.

5. The shock absorber according to claim 4, wherein:

said actuator comprises a rod;

said first disc valve and said second disc valve are connected to said rod; and said rod being configured to move said first disc valve and said second disc valve substantially simultaneously.

6. The shock absorber according to claim 5, wherein:

said rod comprises a first portion and a second portion;

said first portion and said second portion being disposed a substantial distance from one another;

said first portion of said rod comprising said first disc valve;

said second portion of said rod comprising said second disc valve;

said first disc valve and said second disc valve being disposed a substantial distance from one another;

said rod further comprising a third portion;

said third portion of said rod being disposed substantially adjacent said first side of said piston body; and said third portion of said rod comprising a solenoid to displace said first portion and said second portion of said rod.

7. Apparatus for damping spring-mounted wheel suspension systems, said apparatus comprising:

a cylinder;

a damping medium being disposed in said cylinder;

a piston rod;

a piston being disposed on said piston rod to divide said cylinder into two work chambers;

at least one hydraulic connection to connect said two work chambers;

at least one fluid connection to connect said two work chambers;

at least one non-return valve being disposed between said two work chambers;

said at least one non-return valve being disposed within said at least one fluid connection;

an actuator;

said at least one non-return valve having a first operating position corresponding to a first flow resistance for a first direction of flow of said damping medium;

said actuator having a first operating position to move said at least one non-return valve into said first operating position of said at least one non-return valve;

said at least one non-return valve having a second operating position corresponding to a second flow resistance for a second direction of flow of said damping medium;

said actuator having a second operating position to move said at least one non-return valve into said second operating position of said at least one non-return valve;

said actuator being switchable between said first and second operating positions of said actuator to move said at least one non-return valve between said first and second operating positions of said at least one non-return valve;

said at least one non-return valve comprising a first disc valve and a second disc valve;

said first disc valve being connected to said actuator;

said second disc valve being connected to said actuator;

said first disc valve and said second disc valve being coupled together by said actuator; and said first disc valve and said second disc valve being configured and disposed to be displaced together by said actuator.

8. Apparatus according to claim 7, wherein said first disc valve and said second disc valve are disposed to be movable between said first and second operating positions by at least one of: axial movement and rotational movement of said actuator.

9. Apparatus according to claim 8, wherein:

said damping medium travels a first flow distance in said at least one fluid connection for the first direction of flow;

said damping medium travels a second flow distance in said at least one fluid connection for the second direction of flow; and said first flow distance is substantially equal to said second flow distance.

10. Apparatus according to claim 9, wherein:

said actuator has a third operating position corresponding to a third flow resistance of said at least one non-return valve being in said second operating position;

said at least one non-return valve travels a first distance in moving from said first operating position to said second operating position of said at least one non-return valve;

said actuator travels a second distance in moving from said first operating position to said third operating position of said actuator; and said second distance is substantially greater than said first distance.

11. Apparatus according to claim 7, wherein said apparatus comprises a pilot valve to pilot said at least one non-return valve.

12. Apparatus as claimed in claim 11, wherein:

said at least one fluid connection is configured as a channel; and said channel is substantially centered within said piston and said piston rod.

13. Apparatus according to claim 7, wherein said at least one fluid connection comprises a damping valve.

14. Apparatus according to claim 7, wherein said at least one non-return valve has a substantially constant throttle in at least one direction of flow of said damping medium.

15. Apparatus according to claim 7, wherein said at least one fluid connection is disposed within said piston.

16. Apparatus according to claim 7, wherein:

said first operating position of said at least one non-return valve represents said first disc valve disposed in a closed position;

said first disc valve comprises a side disposed to prevent flow of said damping medium; and said actuator is switched from said first operating position in response to the pressure of said damping medium dropping below a predetermined level on said side of said first disc valve.

17. Apparatus according to claim 7, wherein said at least one non-return valve is disposed in a floating manner relative to said actuator to move into one of said first and second operating positions of said at least one non-return valve substantially independently of said actuator.

18. Apparatus according to claim 7, wherein:

said at least one fluid connection comprises a first valve seat surface and a second valve seat surface;

said first valve seat surface is disposed a substantial distance from said second valve seat surface;

said first disc valve is disposed to operatively contact said first valve seat surface upon said at least one non-return valve being disposed in said first operating position;

said second disc valve is disposed to operatively contact said second valve seat surface upon said at least one non-return valve being disposed in said second operating position; and said first disc valve and said second disc valve are switchable between said first and second valve seat surfaces in response to said actuator moving between said first and second operating positions of said actuator.

* * * * *

UNITED STATES PATENT AND TRADEMARK OFFICE
CERTIFICATE OF CORRECTION

PATENT NO.   : 5,833,037
DATED        : November 10, 1998
INVENTOR(S)  : Alfred PREUKSCHAT It is certified that error appears in the above-indentified patent and that said Letters Patent is hereby corrected as shown below:

In column 11, line 45, Claim 1, after 'piston', delete "rode" and insert --rod--.

Signed and Sealed this

Twentieth Day of June, 2000

Q. TODD DICKINSON

*Attest:*

*Attesting Officer*             *Director of Patents and Trademarks*